(12) United States Patent
Chiba et al.

(10) Patent No.: US 10,078,584 B2
(45) Date of Patent: Sep. 18, 2018

(54) REDUCING MINOR GARBAGE COLLECTION OVERHEAD

(71) Applicant: INTERNATIONAL BUSINESS MACHINES CORPORATION, Armonk, NY (US)

(72) Inventors: Tatsuhiro Chiba, Tokyo (JP); Hiroshi Horii, Tokyo (JP); Tamiya Onodera, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 15/148,118

(22) Filed: May 6, 2016

(65) Prior Publication Data

US 2017/0322879 A1    Nov. 9, 2017

(51) Int. Cl.
G06F 12/08    (2016.01)
G06F 12/02    (2006.01)
G06F 17/30    (2006.01)
G06F 12/0893  (2016.01)
G06F 3/06     (2006.01)

(52) U.S. Cl.
CPC ........ *G06F 12/0269* (2013.01); *G06F 3/0608* (2013.01); *G06F 3/0647* (2013.01); *G06F 3/0652* (2013.01); *G06F 3/0683* (2013.01); *G06F 12/0893* (2013.01); *G06F 17/30958* (2013.01); *G06F 2212/1044* (2013.01); *G06F 2212/60* (2013.01)

(58) Field of Classification Search
CPC .. G06F 12/0269; G06F 3/0608; G06F 3/0647; G06F 3/0652; G06F 3/0683; G06F 12/0893; G06F 17/30958

USPC .......................................................... 711/121
See application file for complete search history.

(56) References Cited

U.S. PATENT DOCUMENTS

| 6,839,725 | B2 | 1/2005 | Agesen et al. |
| 7,606,989 | B1 | 10/2009 | Detlefs et al. |
| 7,676,511 | B2 | 3/2010 | Printezis et al. |
| 8,229,968 | B2* | 7/2012 | Wang .................. G06F 12/0875 707/748 |
| 8,250,121 | B2 | 8/2012 | Daynes et al. |
| 2002/0144101 | A1* | 10/2002 | Wang .................... G06F 9/3802 712/240 |
| 2012/0197944 | A1* | 8/2012 | Foti ...................... G06F 12/0253 707/798 |
| 2015/0067088 | A1* | 3/2015 | Guerin .................. G06F 15/167 709/213 |
| 2016/0105511 | A1* | 4/2016 | Guerin .................. G06F 15/167 709/212 |

* cited by examiner

*Primary Examiner* — Pierre Miche Bataille
(74) *Attorney, Agent, or Firm* — Tutunjian & Bitetto, P.C.; Vazken Alexanian

(57) ABSTRACT

A method and system are provided for reducing garbage collection overhead. The method includes representing, by a hardware processor, an application program by a Directed Acyclic Graph having a set of nodes. Each of the nodes represents a respective one of a plurality of computation tasks. The method further includes specifying, by the hardware processor from the set of nodes, any of the nodes which store a respective computation result for at least a threshold period of time as cache nodes. The method further includes allocating, by the hardware processor, the respective computation result of each of the cache nodes into a tenure area of a memory.

20 Claims, 4 Drawing Sheets

REDUCING MINOR GARBAGE COLLECTION OVERHEAD

BACKGROUND

Technical Field

The present invention generally relates to garbage collecting in computing, and more particularly to reducing minor garbage collection overhead.

Description of the Related Art

Generational garbage collection (GC) is example of a GC policy. Generational GC is widely used in current modern memory management systems. In generational GC, objects are created in a "nursery" space. A garbage collector mostly performs "minor" collections, which garbage collect the nursery, copying live objects from one region to another there. If objects are copied a certain number of times in the nursery space (that is, if they survive long), they are promoted to the "tenure" space. In generational GC, efficiency is based on the generational hypothesis that most objects die young.

Apache Spark is an in-memory oriented cluster computing framework for performing big data analytics on a large distributed system. Spark's programming model is based on Resilient Distributed Datasets (RDDs). A RDD is logical distributed collection of data partitioned over multiple machines. RDD offers two types of operations, namely transformations and actions. Application programs are represented as a Directed Acyclic Graph (DAG) that, in turn, represents the data transformation chain of RDDs. A node in a DAG corresponds to a RDD (computation result) and an edge in a DAG corresponds to an operation (computation task). Since a RDD is immutable, RDDs which are reused many times should be long-lived in a heap, whereas intermediately used RDDs will be disposable, which means that the objects in these RDDs die young.

Minor collection is basically fast and the overhead is low. However, minor collections frequently occur while immutable RDDs are often generated and reclaimed in nursery space. As a consequence, minor collection overhead is dominant in the total GC pause time. Moreover, some RDDs are obviously used several times, but the Java Virtual Machine (JVM®) runtime does not know which objects are short-lived or long-lived, so that minor collection tries to perform a copying garbage collection operation even if the objects are long-lived. Thus, there is a need for reducing minor garbage collection overhead.

SUMMARY

According to an aspect of the present principles, a method is provided for reducing garbage collection overhead. The method includes representing, by a hardware processor, an application program by a Directed Acyclic Graph having a set of nodes. Each of the nodes represents a respective one of a plurality of computation tasks. The method further includes specifying, by the hardware processor from the set of nodes, any of the nodes which store a respective computation result for at least a threshold period of time as cache nodes. The method further includes allocating, by the hardware processor, the respective computation result of each of the cache nodes into a tenure area of a memory.

According to another aspect of the present principles, a non-transitory computer readable storage medium is provided. The non-transitory computer readable storage medium includes a computer readable program for reducing garbage collection overhead. The computer readable program when executed on a computer causes the computer to perform a method. The method includes representing, by a hardware processor, an application program by a Directed Acyclic Graph having a set of nodes. Each of the nodes represents a respective one of a plurality of computation tasks. The method further includes specifying, by the hardware processor from the set of nodes, any of the nodes which store a respective computation result for at least a threshold period of time as cache nodes. The method also includes allocating, by the hardware processor, the respective computation result of each of the cache nodes into a tenure area of a memory.

According to yet another aspect of the present principles, a system is provided. The system includes a memory partitioned into a nursery area and a tenure area. The system further includes a hardware processor configured to represent an application program by a Directed Acyclic Graph having a set of nodes. Each of the nodes represents a respective one of a plurality of computation tasks. The hardware processor is further configured to specify, from the set of nodes, any of the nodes which store a respective computation result for at least a threshold period of time as cache nodes. The hardware processor is also configured to allocate the respective computation result of each of the cache nodes into the tenure area of a memory.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

The present principles are directed to reducing minor garbage collection (GC) overhead.

In an embodiment, the present principles reduce minor garbage collection overhead by deciding a "cache node", which is used multiple times, based on analyzing a result of a high level application program abstraction that is represented as a Directed Acyclic Graph (DAG) and then directly allocating the objects generated from the specified "cache node" into tenure space (referred to herein as "pre-tenuring") instead of putting them in nursery space.

Typically, an object is considered garbage when it can no longer be reached from any pointer in the running program. In generational GC, memory is managed in generations, or memory pools that store objects of different ages. Garbage collection occurs in each generation when the generation fills up. Objects are allocated in a generation for younger objects or the young generation and, due to infant mortality, most objects die there. When the young generation fills up it causes a minor collection. Minor collections can be optimized assuming a high infant mortality rate. Collecting cost is proportional to the number of love objects being collected. A young generation full of dead objects is collected very quickly. Some surviving objects are moved to a tenured generation. When the tenured generation needs to be collected, there is a major collection that is often much slower because it involves all live objects.

Thus, a generational collector manages memory in a series of areas of increasingly longer-lived objects. These areas are called generations. The youngest generation, a.k.a. the "nursery" generation or the "Eden" generation (or "nursery" or "Eden" in short), consists of objects that have just been created. The nursery generation tends to see a lot of change, as objects come and go from this generation all the time. The older generations have significantly less change, since the longer an object lasts, the more likely it will continue to last.

Hence, a generational collector gains efficiency by partitioning memory as noted above, since the collector can spend most of its time looking in the small nursery generation, and it can ignore the oldest generations most of the time. By limiting the amount of memory that needs to be looked at, the collector reduces the amount of work it needs to do.

Figure 1:
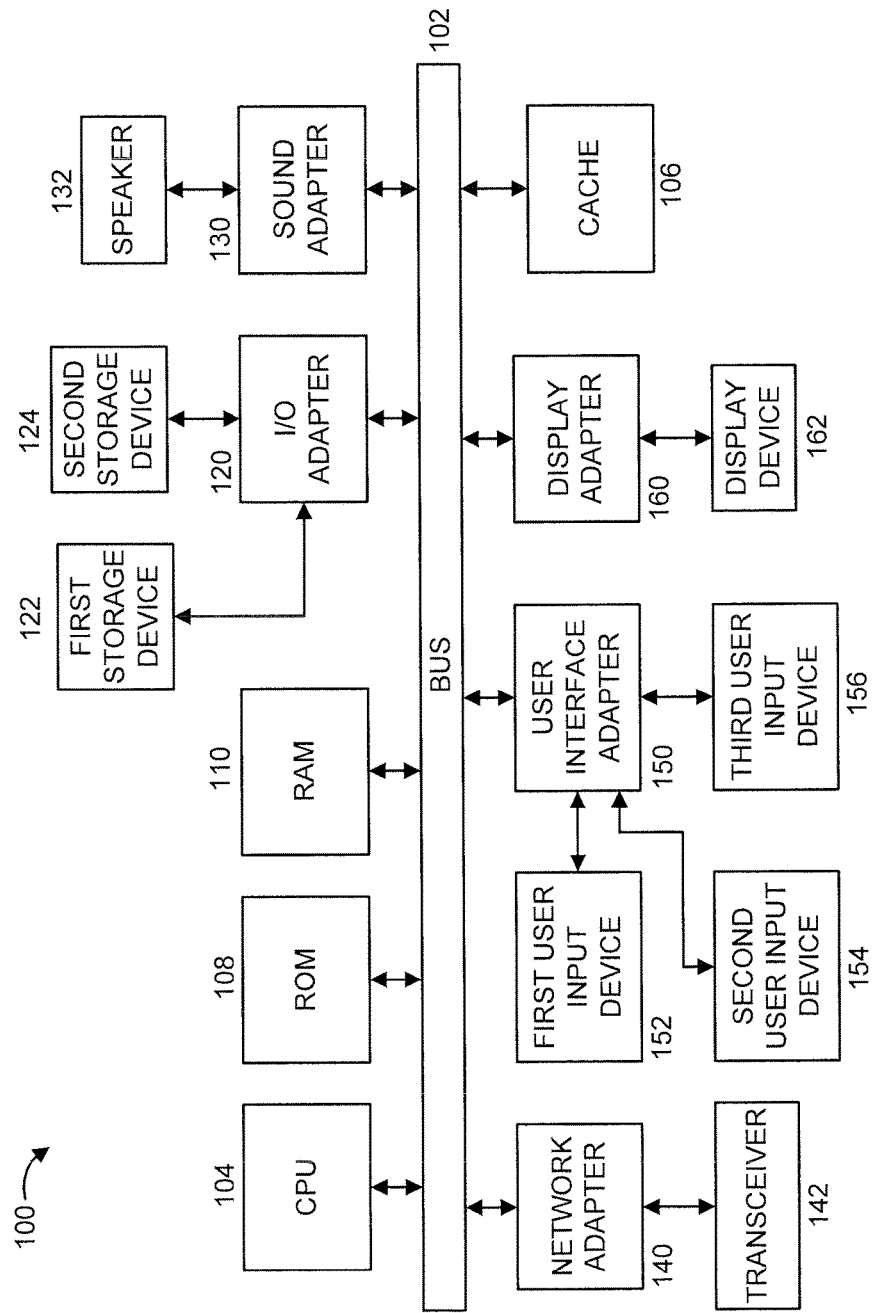
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
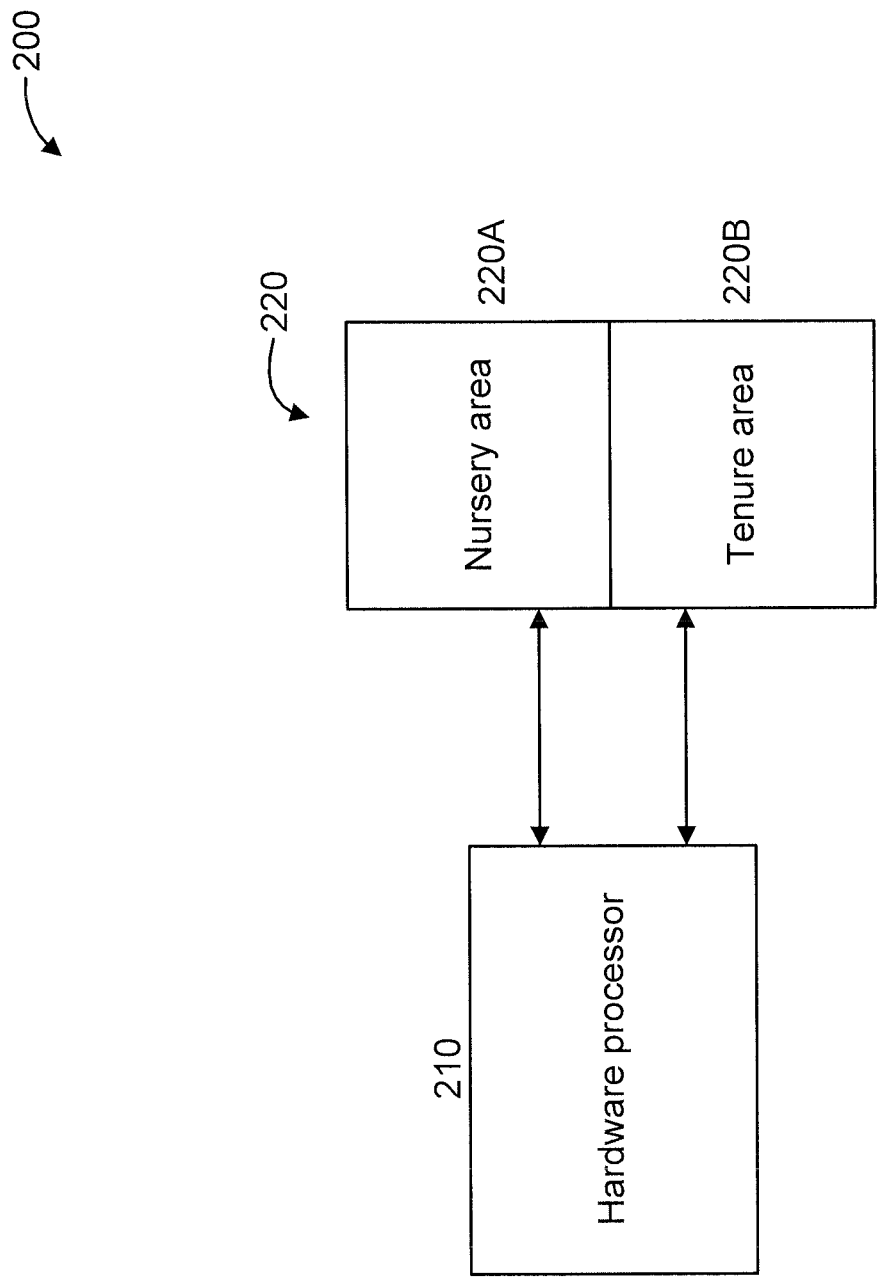
FIG. 2 shows an exemplary system 200 for performing generational garbage collection, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
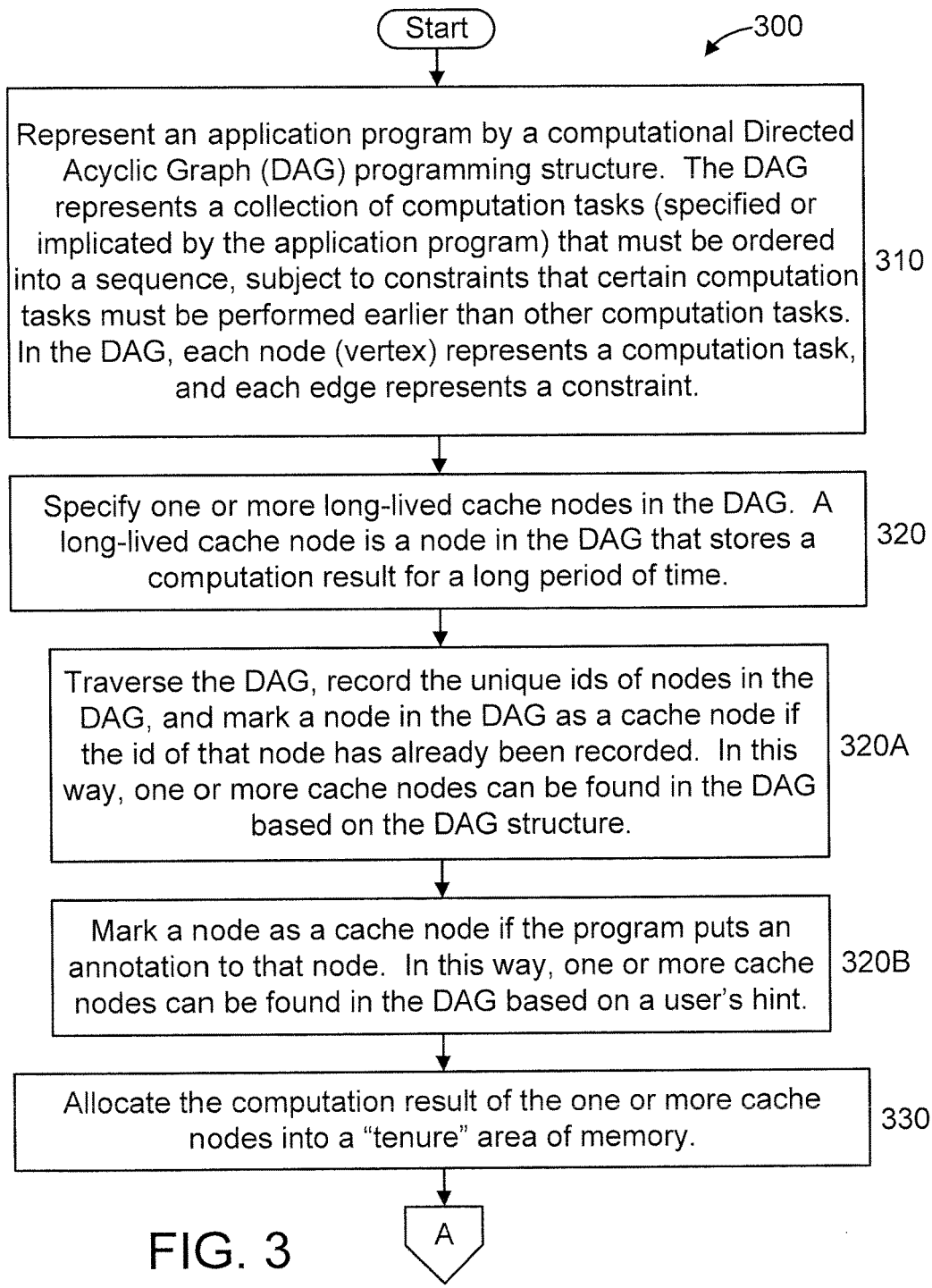
FIGS. 3-4 show an exemplary method 300 for reducing minor garbage collection overhead, in accordance with an embodiment of the present principles.
Figure 4:
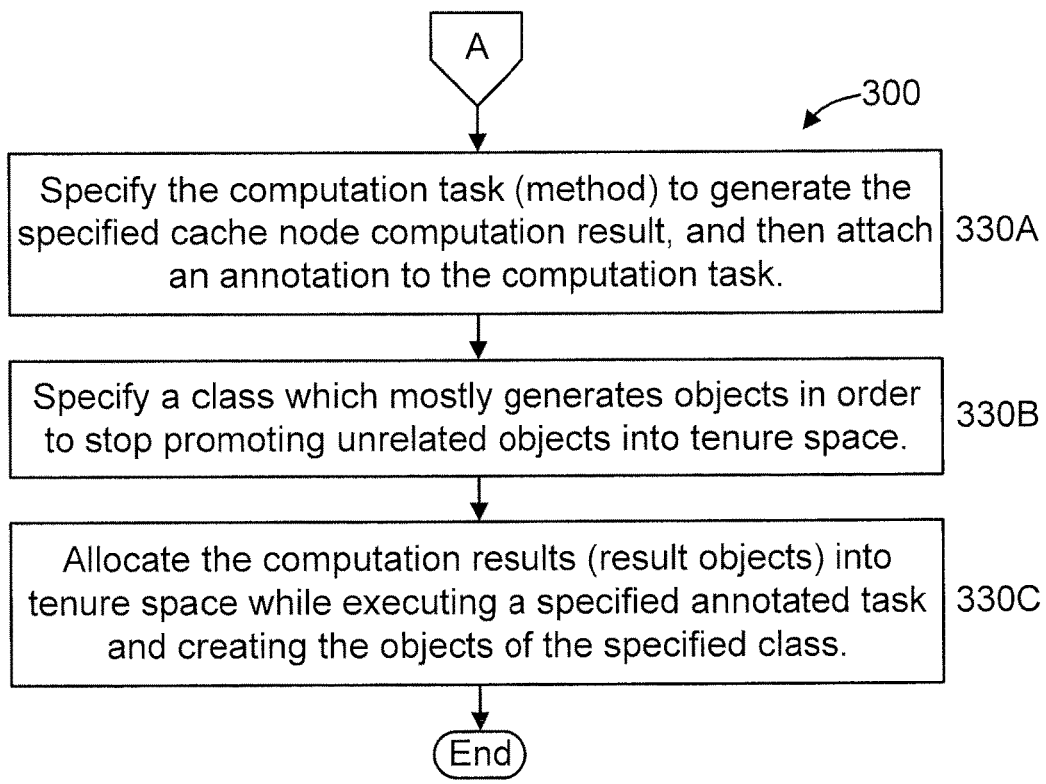

Further, it is to be appreciated that processing system 100 may perform at least part of the method described herein including, for example, at least part of method 300 of FIGS. 3-4. Similarly, part or all of system 200 may be used to perform at least part of method 300 of FIGS. 3-4.

FIG. 2 shows an exemplary system 200 for performing generational garbage collection, in accordance with an embodiment of the present principles.

The system 200 includes a hardware processor 210 and a memory 220. The elements of system 200 are configured to implement generational garbage collection.

The memory 220 includes a nursery area 220A and a tenure area 220B. In an embodiment, the hardware processor 210 partitions the memory 220 into the nursery area 220A and the tenure area 220B. While the embodiment of FIG. 2 shows two areas in memory for the sake of illustration, each pertaining to a different generation, in other embodiments, more than two areas can be created and used in memory for garbage collection in accordance with the present principles, while maintaining the spirit of the present principles. In such other embodiments, as in the embodiment of FIG. 2, an initial area in memory is bypassed in favor of another area, where the initial area that is bypassed corresponds to a newer generation as compared to the other area.

The hardware processor 210 performs minor and major garbage collections using various areas of the memory 220. In an embodiment, the hardware processor 210 performs a minor garbage collection periodically, and performs a major garbage collection when the tenure area 220B is filled up.

In an embodiment, the hardware processor 210 analyzes a high-level application program abstraction. In an embodiment, the high-level application program abstraction is a Directed Acyclic Graph (DAG). In the DAG, each node (vertex) represents a computation task, and each edge represents a constraint. Of course, the present principles are not limited to DAGs and, thus, other high-level application program abstractions can also be used in accordance with the teachings of the present principles, while maintaining the spirit of the present principles.

In an embodiment, the hardware processor 210 analyzes a DAG to identify long-lived cache nodes therein. As used herein, the term long-lived cache node refers to a node in a DAG that stores a computation result for a long period of time. The basis for determining that a computation result is stored for a long period of time so as to be stored in a cache node for the purposes of the present principles can include two exemplary basis as described herein. One basis is that the unique id (identifier) of a node in the DAG is encountered at least twice, where that node is then considered a cache node for the purposes of the present principles. Another basis is that the application program puts an annotation on a given node, where that node is then considered a cache node for the purposes of the present principles. Objects generated from a cache node are directly allocated into the tenure area 220B instead of putting them into the nursery area 220A. In this way, objects are "pre-tenured", thereby reducing minor garbage collection overhead.

FIGS. 3-4 show an exemplary method 300 for reducing minor garbage collection overhead, in accordance with an embodiment of the present principles. Method 300 pertains to a minor garbage collection operation versus a major garbage collection operation, as readily appreciated by one of ordinary skill in the art.

At step 310, represent an application program by a computational Directed Acyclic Graph (DAG) programming structure (hereinafter "DAG" in short). The DAG represents a collection of computation tasks (specified or implicated by the application program) that must be ordered into a sequence, subject to constraints that certain computation tasks must be performed earlier than other computation tasks. In the DAG, each node (vertex) represents a computation task, and each edge represents a constraint.

At step 320, specify one or more long-lived cache nodes in the DAG. A long-lived cache node (hereinafter "cache node" in short) is a node in the DAG that stores a computation result for a long period of time.

In an embodiment, step 320 includes steps 320A and 320B.

At step 320A, traverse the DAG, record the unique ids (hereinafter "ids") of nodes in the DAG, and mark a node in the DAG as a cache node if the id of that node has already been recorded (encountered and registered). In this way, one or more cache nodes can be found in the DAG based on the DAG structure.

At step 320B, mark a node as a cache node if the program puts an annotation to that node. In this way, one or more cache nodes can be found in the DAG based on a user's hint.

At step 330, allocate the computation result of the one or more cache nodes into a "tenure" area of memory. That is, pre-tenure the result objects generated on the "cache node".

In an embodiment, step 330 includes steps 330A, 330B, and 330C.

At step 330A, specify the computation task (method) to generate the specified cache node computation result, and then attach an annotation to the computation task.

At step 330B, specify a class which mostly generates objects in order to stop promoting unrelated objects into tenure space.

At step 330C, allocate the computation results (result objects) into tenure space while (or simply responsive to) executing a specified annotated task and creating the objects of the specified class.

Further regarding step 330B, there is no threshold to determine the eligibility of a class, which is promoted to tenure space while processing a specified annotated computation task. Instead, a backend storage is identified for storing the result objects, and the all objects pushed into the backend storage are created in tenure space. Hence, at step 330B, a class is specified which mostly generates objects by specifying a storage class, and then the other objects which are not put into the storage class are tagged as unrelated objects. Exemplary code for the preceding is as follows:

```
// specify a class for backend storage (e.g. BackendHashMap<K,V>)
global val storage = BackendHashMap<K,V>( );
// the result objects are generated in tenure space because finally they are
pushed into specified backend storage
// tmp variable is not pushed into storage, so no need to generate in tenure
space.
def compute( ) {
   val key = ...;
   val tmp = ...;
   val result = ... ; (e.g. it includes 1,000 Long objects in an array)
   storage.put(key, result);
}
```

Thus, the present principles perform pre-tenuring based on analyzing the structure of a program high level abstraction (workflow and DAG), and then specifying the task and result on the cache node. Accordingly, the computation results stored in the cache nodes are not initially placed into the nursery area, but instead are placed into the tenure space (hence the term "pre-tenuring"), thus bypassing the nursery area.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for reducing garbage collection overhead, comprising:
   representing, by a hardware processor, an application program by a Directed Acyclic Graph having a set of nodes, each of the nodes representing a respective one of a plurality of computation tasks;
   specifying, by the hardware processor from the set of nodes, any of the nodes which store a respective computation result for at least a threshold period of time as cache nodes; and
   allocating, by the hardware processor, the respective computation result of each of the cache nodes into a tenure area of a memory.

2. The method of claim 1, wherein said specifying step specifies the cache nodes from the set of nodes based on a structure of the Directed Acyclic Graph.

3. The method of claim 1, wherein said specifying step comprises:
recording identifiers of the nodes; and
marking as the cache nodes, any of the nodes having an identifier recorded at least twice.

4. The method of claim 1, wherein said specifying step comprises marking as the cache nodes, any of the nodes that are annotated by the application program.

5. The method of claim 1, wherein said allocating step comprises, for each of the cache nodes:
specifying a respective one of the plurality of computation tasks to generate the respective computation result;
attaching an annotation to the respective one of the plurality of computation tasks;
specifying a class which primarily generates objects in order to stop promoting unrelated objects into tenure space; and
allocating the respective computation result into the tenure space of the memory while executing a specified annotated task and creating the objects of the specified class.

6. The method of claim 1, wherein the plurality of tasks are specified or implicated by the application program.

7. The method of claim 1, wherein the Directed Acyclic Graph further has a set of edges, each of the edges representing a constraint on one or more of the plurality of tasks.

8. The method of claim 1, wherein the method is performed in a minor garbage collection stage, and wherein a major collection stage is performed when the tenure space of the memory is filled.

9. The method of claim 1, wherein said allocating step comprises moving the respective computation result of each of the cache nodes from a nursery area of the memory to the tenure area of the memory.

10. A system, comprising:
a memory partitioned into a nursery area and a tenure area;
a hardware processor configured to:
represent an application program by a Directed Acyclic Graph having a set of nodes, each of the nodes representing a respective one of a plurality of computation tasks;
specify, from the set of nodes, any of the nodes which store a respective computation result for at least a threshold period of time as cache nodes; and
allocate the respective computation result of each of the cache nodes into the tenure area of a memory.

11. The system of claim 10, wherein the hardware processor specifies the cache nodes from the set of nodes based on a structure of the Directed Acyclic Graph.

12. A non-transitory computer readable storage medium comprising a computer readable program for reducing garbage collection overhead, wherein the computer readable program when executed on a computer causes the computer to perform the steps of:
representing, by a hardware processor, an application program by a Directed Acyclic Graph having a set of nodes, each of the nodes representing a respective one of a plurality of computation tasks;
specifying, by the hardware processor from the set of nodes, any of the nodes which store a respective computation result for at least a threshold period of time as cache nodes; and
allocating, by the hardware processor, the respective computation result of each of the cache nodes into a tenure area of a memory.

13. The non-transitory computer readable storage medium of claim 12, wherein said specifying step specifies the cache nodes from the set of nodes based on a structure of the Directed Acyclic Graph.

14. The non-transitory computer readable storage medium of claim 12, wherein said specifying step comprises:
recording identifiers of the nodes; and
marking as the cache nodes, any of the nodes having an identifier recorded at least twice.

15. The non-transitory computer readable storage medium of claim 12, wherein said specifying step comprises marking as the cache nodes, any of the nodes that are annotated by the application program.

16. The non-transitory computer readable storage medium of claim 12, wherein said allocating step comprises, for each of the cache nodes:
specifying a respective one of the plurality of computation tasks to generate the respective computation result;
attaching an annotation to the respective one of the plurality of computation tasks;
specifying a class which primarily generates objects in order to stop promoting unrelated objects into tenure space; and
allocating the respective computation result into the tenure space of the memory while executing a specified annotated task and creating the objects of the specified class.

17. The non-transitory computer readable storage medium of claim 12, wherein the plurality of tasks are specified or implicated by the application program.

18. The non-transitory computer readable storage medium of claim 12, wherein the Directed Acyclic Graph further has a set of edges, each of the edges representing a constraint on one or more of the plurality of tasks.

19. The non-transitory computer readable storage medium of claim 12, wherein the method is performed in a minor garbage collection stage, and wherein a major collection stage is performed when the tenure space of the memory is filled.

20. The non-transitory computer readable storage medium of claim 12, wherein said allocating step comprises moving the respective computation result of each of the cache nodes from a nursery area of the memory to the tenure area of the memory.

* * * * *